United States Patent [19]

Watanabe et al.

[11] Patent Number: 5,117,121
[45] Date of Patent: May 26, 1992

[54] METHOD OF AND APPARATUS FOR APPLYING VOLTAGE TO ELECTROSTATIC CHUCK

[75] Inventors: Toshiya Watanabe; Tetsuo Kitabayashi, both of Kanagawa, Japan

[73] Assignee: Toto Ltd., Fukuoka, Japan

[21] Appl. No.: 513,824

[22] Filed: Apr. 24, 1990

[30] Foreign Application Priority Data

Apr. 25, 1989 [JP] Japan ................. 1-105679

[51] Int. Cl.⁵ .......................... H02N 13/000
[52] U.S. Cl. ............................ 307/130; 361/234; 361/235
[58] Field of Search ................. 307/130, 127; 250/491.1, 492, 396, 398; 148/1.5; 361/143, 144, 145, 207, 437, 225, 235, 234; 320/1

[56] References Cited

U.S. PATENT DOCUMENTS

| | | | |
|---|---|---|---|
| 3,983,401 | 9/1976 | Livesay | 250/492 A |
| 3,993,509 | 11/1976 | McGinty | 148/1.5 |
| 4,184,188 | 1/1980 | Briglia | 361/234 |
| 4,384,918 | 5/1983 | Abe | 156/643 |
| 4,751,609 | 6/1988 | Kasahara | 361/234 |
| 4,771,358 | 9/1988 | Millner | 361/145 |

FOREIGN PATENT DOCUMENTS

0294556A2 12/1988 European Pat. Off. .
47-39392 4/1972 Japan .

OTHER PUBLICATIONS

Abstract of Japanese Patent Application No. 62-255039, dated Jun. 11, 1987, entitled "Releasing Method of Attracted Body from Electrostatic Attracting Device", from *Patent Abstracts of Japan*, vol. 12, No. 131 (M-688) [2978], dated Apr. 22, 1988.

Primary Examiner—J. R. Scott
Assistant Examiner—S. W. Jackson
Attorney, Agent, or Firm—Merchant, Gould, Smith, Edell, Welter & Schmidt

[57] ABSTRACT

A first voltage is first applied to the electrode or electrodes of an electrostatic chuck for electrostatically attracting a workpiece such as a silicon wafer. Then, before the workpiece is removed from the electrostatic chuck, a second voltage which is of opposite polarity to the first voltage is applied to the electrostatic chuck for eliminating a residual attractive force from the electrostatic chuck. The second voltage has a voltage value which is 1.5 to 2 times higher than the voltage value of the first voltage. The second voltage is continuously applied for a period of time which is in inverse proportion to the voltage value of the second voltage.

6 Claims, 2 Drawing Sheets

METHOD OF AND APPARATUS FOR APPLYING VOLTAGE TO ELECTROSTATIC CHUCK

BACKGROUND OF THE INVENTION

1. Field of the Invention

The present invention relates to the field of the application of a voltage to an electrostatic chuck, and more particularly to the application of a voltage to an electrostatic chuck for easy removal of a workpiece attracted to the electrostatic chuck.

2. Description of the Relevant Art

Easy removal of a workpiece electrostatically attracted to an electrostatic chuck may be achieved by temporary reversal of the polarity of a voltage applied to the electrodes of the electrostatic chuck. Such a process of removing a workpiece from an electrostatic chuck is known from Japanese Patent Publication No. 47-39392, for example.

However, when the voltage is applied in the polarity opposite to the polarity of the voltage applied to attract the workpiece, for the removal of the workpiece from the electrostatic chuck, it takes a relatively long period of time (several tens of seconds or more) until the remaining force to attract the workpiece to the chuck is eliminated or reduced for easy removal of the workpiece. As a result, the efficiency of workpiece removal is low.

SUMMARY OF THE INVENTION

According to the present invention, there is provided a method of applying a voltage to an electrostatic chuck a method of applying a voltage to an electrostatic chuck, comprising the steps of applying a first voltage to an electrode of the electrostatic chuck for attracting a workpiece to the electrostatic chuck, and applying, for a predetermined period of time, a second voltage to the electrode for eliminating a residual attractive force from the electrostatic chuck before the workpiece is released from the electrostatic chuck, the second voltage being opposite polarity to the first voltage and having a voltage value higher than the voltage value of the first voltage.

The determined period of time is inversely proportional to the voltage value of the second voltage.

The voltage value of the second voltage is 1.5 to 2 times higher than the voltage value of the first voltage, and wherein the predetermined period of time is in the range of about 5 to 10 seconds depending on the voltage value of the second voltage. The second voltage may be increased gradually and smoothly or in a step-like manner.

In order to remove the workpiece from the electrostatic chuck, the second voltage which is higher than and of opposite polarity to the first voltage is applied to the electrostatic chuck. The residual attractive force is therefore quickly eliminated or reduced, thus allowing the workpiece to be removed with ease.

The time during which the second voltage is applied to the electrostatic chuck is short in inverse proportion to the value of the second voltage, so that the workpiece is prevented from being attracted again to the electrostatic chuck by the continued application of the second voltage.

The residual attractive force can easily be eliminated or reduced when the voltage value of the second voltage is 1.5 to 2 times higher than the voltage value of the first voltage, and the second voltage is applied for about 5 to 10 seconds. The residual attractive force can be eliminated or reduced stably depending on the size and shape of the workpiece, or other properties thereof.

When the second voltage is gradually increased, the workpiece, which may be a semiconductor device, is prevented from being adversely affected by a large instantaneous current which would otherwise flow upon instantaneous application of the full second voltage.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
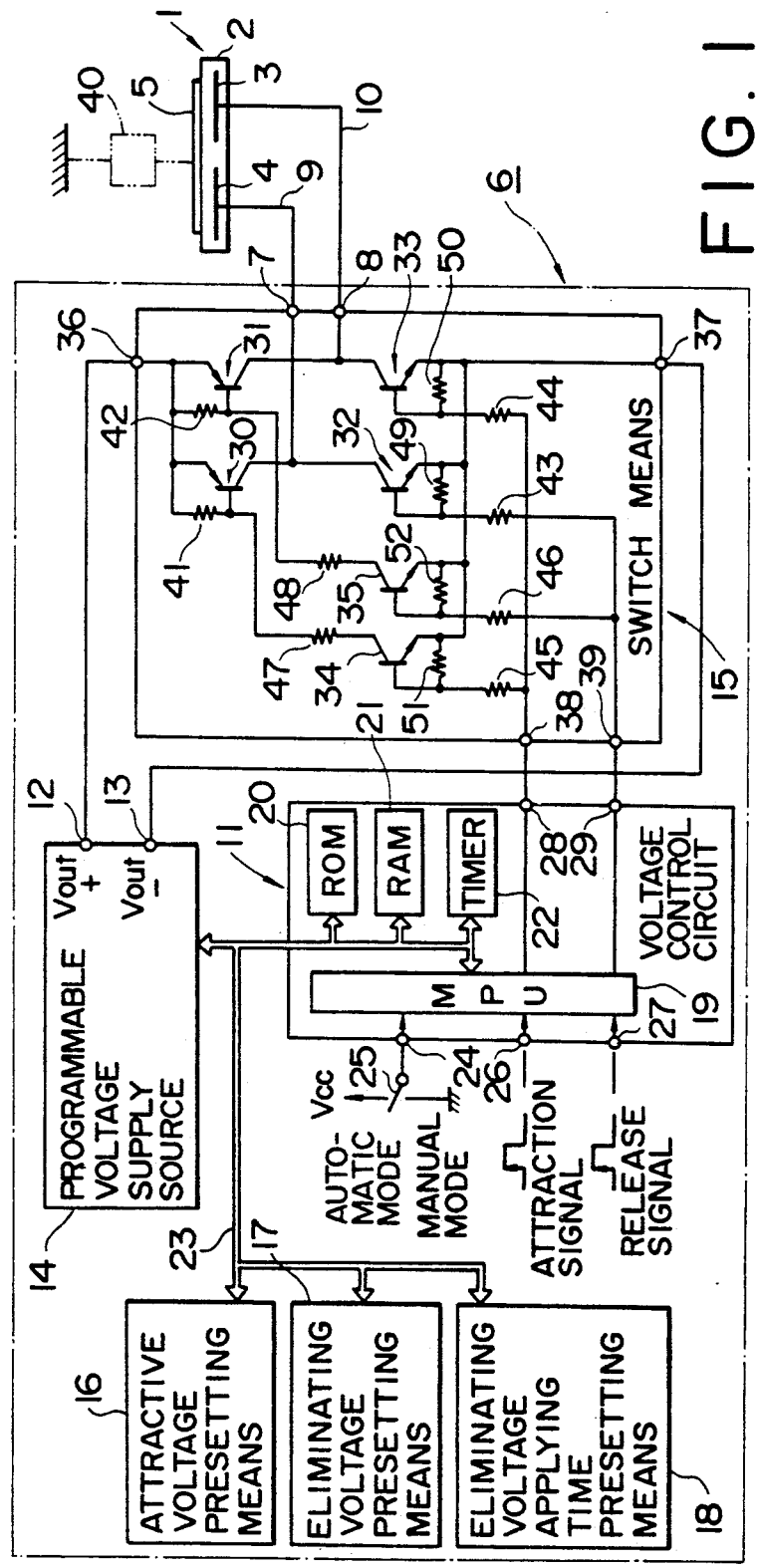
FIG. 1 is a block diagram of an apparatus for applying a voltage to an electrostatic chuck according to the present invention.

As shown in FIG. 1, an electrostatic chuck 1 comprises a pair of interdigital electrodes 3, 4 embedded in a sheet 2 which is made of a dielectric material, typically an alumina-titanium oxide compound. The interdigital electrodes 3, 4 have alternate electrode fingers held in interdigitating relationship. A workpiece 5 such as a silicon wafer is placed on the electrostatic chuck 1. When a voltage is applied between the electrodes 3, 4, the silicone wafer 5 is electrostatically attracted to the electrostatic chuck 1 according to the Johnsen-Rahbek effect. The dielectric sheet 2 has a thickness of 300 $\mu$m and a volume resistivity of $10^{-}\Omega$cm.

A voltage applying apparatus 6 serves as a power supply device for applying a voltage between the electrodes 3, 4. The voltage applying apparatus 6 has output terminals 7, 8 connected to the electrodes 3, 4, respectively, through connector cables 9, 10. The voltage applying apparatus 6 comprises a voltage control circuit 11 for controlling a voltage to be applied, a programmable voltage supply source (hereinafter referred to as a "power supply") 14 for generating an output voltage based on data given from the voltage control circuit 11, a switch means 15 between the power supply 14 and the electrostatic chuck 1, a means 16 for presetting the value of a voltage to attract the workpiece to the electrostatic chuck 1, a means 17 for presetting the value of a voltage to eliminate a residual attractive force, and a means 18 for presetting a time during which to apply the voltage to eliminate the residual attractive force, these presetting means 16, 17, 18 giving various preset conditions to the voltage control circuit 11.

The voltage control circuit 11 comprises a microprocessor unit (hereinafter referred to as an "MPU") 19, a ROM 20, a RAM 21, a timer 22. The ROM 20 stores a program for controlling the voltage to be applied, and also voltage values to eliminate remaining attractive forces based on experimental data and data relating to times during which to apply the voltages. Each of the presetting means 16, 17, 18 has a preset value entry element such as a digital switch or the like, and an interface with a bus 23 (including a data bus and an address bus) of the MPU 19.

Each of the presetting means 16, 17, 18 may be arranged to interface a voltage divided by a graduated slide-type rheostat, with the MPU 19 through an A/D converter.

The voltage control circuit 11 has a terminal 24 to which an operation mode selector switch 25 is connected. The operation mode selector switch 25 can select an automatic mode or a manual mode. The voltage control circuit 11 also has input terminals 26, 27 for receiving attraction and release signals, and output terminals 28, 29 for supplying a voltage application control signal to the switch means 15.

The switch means 15 comprises a switch circuit for varying the polarity of a voltage to be applied between the electrodes 3, 4 of the electrostatic chuck 1. The switch means 15 has four transistors 30 through 33 connected in a bridge, two transistors 34, 35 for driving the transistors 30, 31, respectively, base resistors 41 through 46 connected to the respective bases of the transistors 30 through 35, collector resistors 47, 48 connected to the respective collectors of the transistors 34, 35, and base-emitter resistors 49 through 52 connected between the bases and emitters of the transistors 32 through 35. Alternatively, the switch means 15 may comprise semiconductor switching elements such as field-effect transistors, thyristors, or the like, other than bipolar transistors, or may comprise relays.

The switch means 15 has positive and negative power input terminals 36, 37 connected respectively to the positive and negative output terminals 12, 13 of the power supply 14. The switch means 15 also has input terminals 38, 38 coupled respectively to the output terminals 28, 29 of the voltage control circuit 11. While a high-level signal is being applied from the output terminal 28 of the voltage control circuit 11 to the input terminal 38 of the switch means 15, the voltage applying apparatus 6 produces a voltage between the output terminals 7, 8 with such polarity that the output terminal 7 is at a positive potential and the output terminal 8 at a negative potential. While a high-level signal is being applied to the other input terminal 39, the voltage applying apparatus 6 produces a voltage between the output terminals 7, 8 with opposite polarity.

Prior to the description of operation of the voltage applying apparatus 6, the manner in which residual attractive forces vary in response to application of an attraction eliminating voltage will first be described below with reference to FIGS. 2 and 3.

After the silicon wafer 5 has been attracted to the electrostatic chuck 1 under certain attracting conditions, the application of the voltage to the electrostatic chuck 1 is stopped. FIGS. 2 and 3 show residual attractive forces after the removal of the applied voltage, the residual attractive forces being measured by a load cell 40 shown in FIG. 1.

Figure 2:
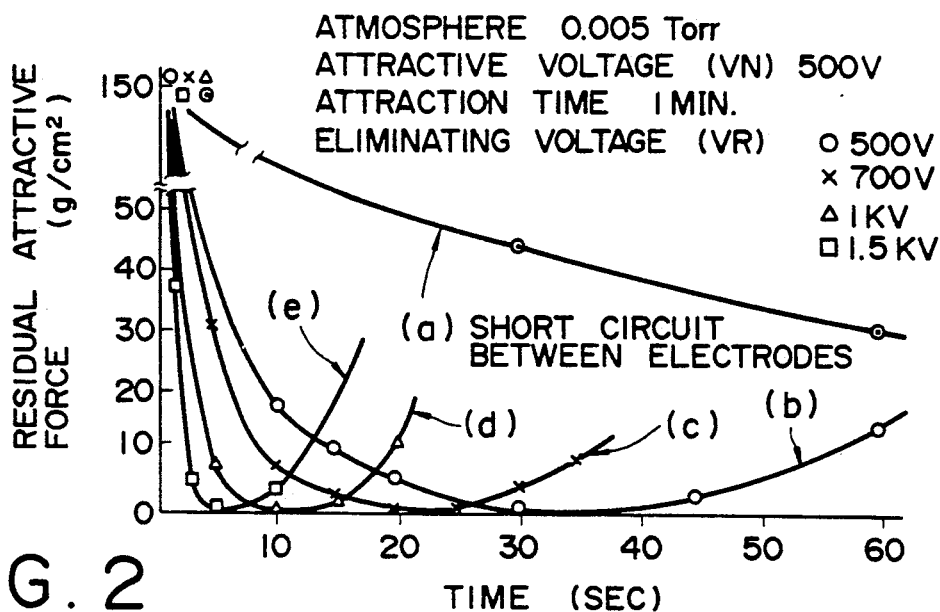
FIGS. 2 and 3 are graphs showing measured residual attractive forces with which a workpiece is attracted to an electrostatic chuck.

FIG. 2 illustrates residual attractive forces which remain after a voltage (hereinafter referred to as a "attractive voltage VN") of 500 V for producing attractive forces was applied for 1 minute in a vacuum atmosphere under the pressure of 0.005 Torr. The curve (a) shows a residual attractive force which varied of its own accord with time after the electrodes 3, 4 were short-circuited to each other to stop the voltage application. The curves (b) through (e) show residual attractive forces which varied with time after voltages (hereinafter referred to as "eliminating voltage VR") of 500 V, 700 V, 1 KV, 1.5 KV for eliminating residual attractive forces, which voltages (VR) are of opposite polarity to the voltage (VN), were applied.

The graph of FIG. 2 indicates that the residual attractive forces can be eliminated or reduced quickly when the eliminating voltages VR higher than the voltage VN are applied in a short period of time after the attractive voltage VN. If the voltages VR of opposite polarity to the attractive voltage VN are applied for a longer period of time, then the silicon wafer 5 is attracted again to the electrostatic chuck 1 by the eliminating voltages VR, which now serve as attractive voltages of opposite polarity.

Figure 3:
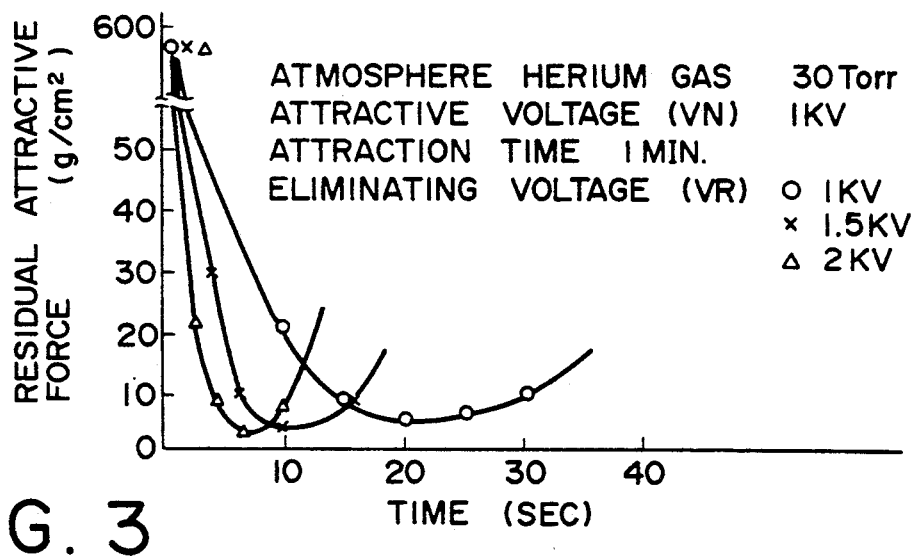

FIG. 3 shows residual attractive forces which remain after an attractive voltage VN of 1 KV was applied for 1 minute in a helium gas atmosphere under the pressure of 30 Torr. When the attractive voltage and/or the time during which to apply the attractive voltage is increased, the residual attractive forces are also increased, and the conditions in which to apply eliminating voltages to eliminate or reduce the residual attractive forces vary.

It is preferable that the eliminating voltage VR be applied for a period of time which is inversely proportional to the voltage value of the eliminating voltage VR.

In view of the foregoing characteristics of the residual attractive forces imposed by the electrostatic chuck 1, the ROM 20 in the voltage control circuit 11 stores data with respect to conditions for applying eliminating voltages, depending on conditions for applying attractive voltages.

When the operation mode selector switch 25 selects an automatic mode, the voltage applying apparatus 6 operates as follows:

When the attraction signal applied to the input terminal 26 goes high in level, the MPU 19 reads a preset voltage value from the attractive voltage presetting means 16 through the bus 23, and sends the preset voltage value to the power supply 14 through the bus 23. The power supply 14 now generates a preset voltage between the output terminals 12, 13. Then, the MPU 19 outputs a high-level attractive voltage applying control signal to the output terminal 28. The high-level attractive voltage applying control signal is transmitted to the input terminal 38 of the switch means 15, enabling the transistor 34 to turn on the transistor 30 and also turning on the transistor 33. The voltage applying apparatus 6 now produces a voltage (attractive voltage VN) between the output terminals 7, 8, with the output terminal 7 being positive and the output terminal 8 being negative. The electrode 4 of the electrostatic chuck 1 is held at a positive potential, and the electrode 3 at a negative potential. The attractive voltage VN is continuously applied to the electrostatic chuck 1 until a high-level release signal is applied to the input terminal 27 of the voltage control circuit 11. The time during which the attractive voltage VN is continuously applied to the input terminal 27 is measured by the timer 22.

When a high-level release signal is applied to the input terminal 27, the MPU 19 makes the signal level low at the output terminal 28, and selects an optimum one of the eliminating voltage data stored in the ROM 20 based on the applied attractive voltage VN and the time during which it is applied.

In this embodiment, the MPU 19 is controlled by a selecting algorithm which selects the value of an eliminating voltage VR that is 1.5 to 2 times higher than the attractive voltage VN and also selects a period of time ranging from about 5 to 10 seconds during which the selected eliminating voltage VR is to be applied, according to the characteristics (shown in FIGS. 2 and 3) with which the residual attractive forces vary upon application of the eliminating voltages.

If a high voltage were instantaneously applied to the electrostatic chuck 1. a considerably large instantaneously current would flow upon starting to apply the high voltage. In order to prevent the workpiece 5 such as a semiconductor device from being adversely affected by the large instantaneous current, the eliminating voltage is applied such that it gradually increases up to the selected voltage, substantially in a first half interval of the selected period of time in which to apply the eliminating voltage. The eliminating voltage may be increased linearly gradually and smoothly, or in a steplike manner. However, a gradual smooth increase in the eliminating voltage is more advantageous for the protection of the workpiece attracted to the electrostatic chuck 1.

The MPU 19 sends the selected eliminating voltage value to the power supply 14, and also outputs a high-level signal to the output terminal 29 for the selected period of time.

The high-level signal is applied to the input terminal 39 of the switch means 15, turning on the transistors 31, 32. The output terminal 7 is now held at the negative potential, whereas the output terminal 8 is held at the positive potential. Therefore, the selected eliminating voltage VR is applied between the electrodes 3, 4 of the electrostatic chuck 1 with such polarity that the electrode 4 is held at the negative potential and the electrode 3 at the positive potential. The eliminating voltage VR is continuously applied for the selected period of time.

When the operation mode selector switch 25 is shifted to the manual mode, the MPU 19 reads a preset voltage value from the eliminating voltage presetting means 17 and also a preset period of time from the eliminating voltage applying time presetting means 18 in response to a release signal applied to the input terminal 27. The MPU 19 then outputs a high-level signal to the output terminal 29 for the preset period of time.

In the manual mode, only either one of the eliminating voltage value and the eliminating voltage applying time may be preset, and the other condition may be selected by the MPU 19 based on the data stored in the ROM 20.

Figure 4:
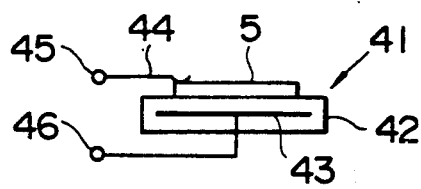
FIG. 4 is a schematic view of a unipolar electrostatic chuck.

While the bipolar electrostatic chuck has been described in the illustrated embodiment, the principles of the present invention are also applicable to a unipolar electrostatic chuck 41 shown in FIG. 4. As shown in FIG. 4, the electrostatic chuck 41 includes a dielectric sheet 42, an electrode 43 embedded therein, a contact member 44 for contact with a workpiece 5 such as a silicon wafer or the like, and connector terminals 45, 46 for connection to the output terminals 7, 8 of the voltage applying apparatus 6 illustrated in FIG. 1.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A method of applying a voltage to an electrostatic chuck, comprising the steps of:

applying a first voltage to an electrode of the electrostatic chuck for attracting a workpiece to the electrostatic chuck; and applying, for a predetermined period of time, a second voltage to the electrode for eliminating a residual attractive force from the electrostatic chuck before the workpiece is released from the electrostatic chuck, said second voltage being opposite polarity to said first voltage and having a voltage value higher than the voltage value of said first voltage.

2. A method according to claim 1, wherein said predetermined period of time is inversely proportional to the voltage value of said second voltage.

3. A method according to claim 2, wherein said voltage value of the second voltage is 1.5 to 2 times higher than the voltage value of the first voltage, and wherein said predetermined period of time is in the range of about 5 to 10 seconds depending on the voltage value of the second voltage.

4. A method according to claim 1, wherein when said second voltage is applied to the electrode, the second voltage is gradually increased up to the voltage value thereof.

5. An apparatus for applying a voltage to an electrostatic chuck, comprising:

a pair of output terminals for applying a voltage with positive and negative potentials;

voltage supply means for supplying voltages;

switch means between said voltage supply means and the electrostatic chuck, for varying the polarity of voltages to be applied to the electrostatic chuck, depending on voltage control signals applied to the switch means; and voltage control means for indicating voltage values to said voltage supply means and selectively outputting a first voltage control signal to apply a first voltage for attracting a workpiece to the electrostatic and a second voltage control signal to apply a second voltage for eliminating a residual attractive force from the electrostatic chuck, to said switch means, said voltage control means including means for applying said second voltage control signal for a predetermined period of time;

said switch means comprising means for applying, as said second voltage, a voltage of opposite polarity to said first voltage, in response to said second voltage control signal from said voltage control means;

said second voltage having a higher voltage value, as indicated to said voltage supply means by said voltage control means, than the voltage value of said first voltage.

6. An apparatus according to claim 5, wherein said voltage control means having means for storing data with respect to optimum voltage values of said second voltage and periods of time during which said second voltage is to applied, depending on voltage values of said first voltage and periods of time during which said first voltage is applied.

* * * * *

UNITED STATES PATENT AND TRADEMARK OFFICE
CERTIFICATE OF CORRECTION

PATENT NO. : 5,117,121
DATED : May 26, 1992
INVENTOR(S) : Watanabe et al.

It is certified that error appears in the above-identified patent and that said Letters Patent is hereby corrected as shown below:

Column 1, line 32, delete "a method of applying a voltage to an electrostatic";
    line 60, after "short", insert --and--.

Column 2, line 37, change "silicone" to --silicon--;
    line 40, change "10" to --$10^{13}$--.

Column 3, line 34, change "38" (second occurrence) to --39--;
    line 59, change "a" (second occurrence) to --an--.

Column 6, line 27, change "the" (second occurrence) to --said--;
    lines 36-37, delete "," after the word "chuck";
    line 44, after "electrostatic", insert --chuck--;
    line 60, change "having" to --comprises--;
    line 63, after "to", insert --be--.

Signed and Sealed this

Second Day of November, 1993

Attest:

BRUCE LEHMAN

*Attesting Officer*      *Commissioner of Patents and Trademarks*